United States Patent [19]

Smith

[11] 4,363,881

[45] Dec. 14, 1982

[54] METHOD OF MAKING UNIFORMLY-SIZED EXPANDABLE POLYMERIC PARTICLES

[75] Inventor: Stuart B. Smith, Conyers, Ga.

[73] Assignee: Cellofoam A.G., Lucerne, Switzerland

[21] Appl. No.: 289,306

[22] Filed: Aug. 3, 1981

Related U.S. Application Data

[63] Continuation-in-part of Ser. No. 210,566, Nov. 26, 1980, abandoned.

[51] Int. Cl.$^3$ .............................. C08J 9/18; C08J 9/20
[52] U.S. Cl. ........................................ 521/56; 521/59; 521/60
[58] Field of Search ............................ 521/56, 59, 60

[56] References Cited

U.S. PATENT DOCUMENTS

| | | | |
|---|---|---|---|
| 3,192,169 | 6/1965 | Doak | 521/56 |
| 3,265,643 | 8/1966 | Hatana et al. | 521/56 |
| 3,359,220 | 12/1967 | Wright | 521/56 |
| 3,657,162 | 4/1972 | Finestone et al. | 521/56 |
| 3,657,164 | 4/1972 | Jastrow et al. | 521/56 |
| 3,696,060 | 10/1972 | Burt | 521/56 |
| 4,153,763 | 5/1979 | Brocke | 521/56 |
| 4,174,425 | 11/1979 | Saito et al. | 521/56 |
| 4,226,942 | 10/1980 | Wei | 521/918 |

FOREIGN PATENT DOCUMENTS

| | | |
|---|---|---|
| 807237 | 1/1959 | United Kingdom. |
| 994074 | 6/1965 | United Kingdom. |
| 1255237 | 12/1971 | United Kingdom. |
| 1364758 | 8/1974 | United Kingdom. |

*Primary Examiner*—Morton Foelak
*Attorney, Agent, or Firm*—Bert J. Lewen

[57] ABSTRACT

A method of making expandable polymeric particles having a uniform size comprising the size classification of partially polymerized particles and subsequent full polymerization and impregnation with blowing agent of only those particles of a desired size.

15 Claims, No Drawings

METHOD OF MAKING UNIFORMLY-SIZED EXPANDABLE POLYMERIC PARTICLES

This application is a continuation-in-part of co-pending U.S. patent application Ser. No. 210,566, filed Nov. 26, 1980 now abandoned.

This invention relates to a method of making expandable polymeric particles having a uniform size, which method involves the formation of polymeric beads via suspension polymerization and includes the step of classifying the particles by size prior to fully polymerizing the particles. In a preferred embodiment of the invention, partially polymerized particles of an undesired size are recycled to the feed monomer(s) and blowing agent is incorporated only into beads falling within the desired range, preferably during the completion of the polymerization of the particles.

The formation of expandable polymeric particles, such as expandable polystyrene beads for use in expandable molding processes, has historically presented two major difficulties: how to best incorporate the blowing agent into the particle in order to render it expandable and how to achieve expandable particles of a relatively uniform size.

Discussions of problems attending the impregnation of polymeric particles with blowing agent may be found in U.S. Pat. Nos. 3,192,169 to Doak; 3,265,643 to Hatano et al.; 3,359,220 to Wright; 3,657,162 to Finestone et al.; 3,696,060 to Burt; and 4,153,763 to Bracke; and in British Pat. Nos. 807,237 to Styrene Products Ltd.; 998,289 to Dow Chemical Co.; 994,074 to Koppers Co., Inc.; and 1,364,758 to Monsanto Ltd. Where, for example, the polymeric particles or beads are formed by suspension polymerization, if the blowing agent is added to the initial polymerization mixture the following problems may be encountered: reduction in the rate of polymerization; formation of deformed rather than spherical particles; formation of lower molecular weight polymer than would be obtained in the absence of blowing agent; and coagulation of the beads in the suspension. If, on the other hand, the practitioner awaits the formation of finished beads and then incorporates blowing agent via a post-polymerization steeping process, difficulties of a different sort are presented: relatively long steeping periods are required because of the low absorption rate of blowing agent into the finished polymer; the incorporated blowing agent is not uniformly distributed in the beads, usually resulting in particles having hard cores; an excess of blowing agent must be introduced to the impregnation vessel, necessitating the subsequent separation of the excess blowing agent from the impregnated beads; and additional additives are usually required. The preceding art-recognized drawbacks have led to suggestions of impregnation methods involving the addition of some or all of the blowing agent at a point intermediate the initiation of the suspension polymerization and the formation of fully polymerized beads. See, for example, U.S. Pat. Nos. 3,192,169; 3,265,643; 3,359,220; and 3,657,162.

The difficulties of achieving expandable particles of a relatively uniform size are described in U.S. Pat. Nos. 4,085,169 to Saito et al.; 4,153,763 to Bracke; and 4,174,425 to Saito et al; and in British Pat. Nos. 994,074 to Koppers Co., Inc.; 1,255,237 to Sekisui Kagaku Kogyo Kabushiki Kaisha; and 1,364,758 to Monsanto Ltd. Uniformly-sized expandable beads are desired because accurate metering of particles for molding or other processing is facilitated, and thus more uniform quality of finished goods is attainable; and because non-uniformity in size leads to non-uniformity in expansion in the production of finished molded goods. Moreover, beads respectively sized below and above certain minima and maxima may not be useful as expandable particles: for instance, particles that are too small will not retain blowing agent and therefore have no storage or shelf life as expandable particles, generally have a very low degree of polymerization, and present recovery and waste water contamination problems; and particles that are too large result in unduly long impregnation times for the incorporation of blowing agent and a non-uniform distribution of blowing agent within the beads, leading to the production of inferior molded articles.

The inherent difficulty of producing uniformly-sized particles by suspension polymerization, which has been attributed to the necessary presence of a dispersing agent and the need for agitation of the polymerization mixture, has led to a variety of proposed methods for achieving a relatively uniform expandable bead size, most of which include sieving the particles to segregate beads of suitable size.

One method has been to form polystyrene beads by suspension polymerization, screen the finished beads to arrive at a desirable bead size population, and then render the selected beads expandable by impregnation with blowing agent. Although this method avoids the incorporation of blowing agent into beads of a size unsuitable for useful expandable particles and permits rejected beads to be used in non-expanded articles, the screening and re-suspension of the beads for impregnation with blowing agent according to this method necessarily includes the previously described drawbacks associated with impregnating already-formed beads with blowing agent.

If, on the other hand, the re-suspension procedure is avoided by incorporating blowing agent into all of the particles yielded by suspension polymerization, blowing agent is wastefully added to particles that are so small as to be practically useless as expandable particles, due to the lack of storage life, and too large to be uniformly impregnated with blowing agent. And as to both the afore-mentioned types of particles and those particles useful as expandable beads per se but of a size not suitable for the intended application of the sought-for product expandable beads, the utility of the undesired beads is limited by the presence of the blowing agent. Moreover, if the blowing agent is added with the initial polymerization mixture, the unsatisfactory ramifications discussed above are realized.

One proposed method for obtaining uniformly-sized expandable particles essentially utilizes uniformly-sized seed particles of polymer to form uniformly-sized larger particles by accretion and polymerization of monomer. Since no source of seed or nucleating particles is described, other than via screening the product of a conventional suspension polymerization, and since no mention is made of the presence of blowing agent in the seed particles, this method apparently has utility only as an alternative use for undersized particles formed in a conventional process utilizing a post-bead formation blowing agent impregnation system.

Among the objects of the present invention is the provision of a method of making uniformly-sized expandable polymeric particles whereby only beads of a desired size are fully formed and whereby the problems of disposing of beads that are either larger or smaller than desired may be obviated by separating same from beads of a desired size prior to the full polymerization of said undesirable beads and recycling the undesirably-sized beads to the feed monomer(s) for the suspension polymerization. Also provided is a method whereby expandable beads are formed in such a way as to avoid the impregnation of undesirably-sized beads with blowing agent.

According to the invention, a suspension polymerization is conducted in accordance with known procedures for forming polymeric particles until the particles have attained sufficient physical integrity to undergo size classification, for example by screening the particles after cooling and removal of same from the polymerization vessel, but prior to full polymerization of the particles. Because the polymerization is discontinued substantially prior to completion, the segregated particles contain substantial amounts of unpolymerized monomer. The blowing agent and other additives are readily absorbed by this monomer and are uniformly distributed throughout the bead. The optimum degree of polymerization may readily be determined by those skilled in the art. If the polymerization is allowed to proceed to close to completion, the time to absorb the blowing agent becomes unduly long and uniform distribution difficult to obtain. On the other hand, if the polymerization does not proceed adequately for the particles cannot be classified.

The polymerization should be at least 58% complete, preferably from 60 to 80%. These ranges are useful particularly in the case of the preparation of polystyrene beads. The partially polymerized particles are then classified by size in order to segregate those particles falling within the size range desired for the final product expandable beads, with the so-segregated particles preferably being simultaneously impregnated with blowing agent and fully polymerized in a subsequent polymerization reaction. Optionally and preferably, the partially polymerized beads of undesired size are recycled to the feed monomer(s) for dissolution.

The polymerizable material employed in the practice of the invention is preferably styrene, but it can also be a mixture of styrene with one or more copolymerizable monomers, preferably a vinylidene monomer such as a different monovinylidene aromatic monomer, such as alphamethylstyrene, vinyl toluene, p-ethylstyrene, 2,4-dimethylstyrene, o-chlorostyrene, 2,5-dichlorostyrene, and the like. When a comonomer is employed with styrene in the practice of the invention, its concentration should be such that the styrene constitutes at least 50 percent, preferably at least 75 percent, of the weight of the polymerizable material.

The polymerizable material can also contain a rubber, such as natural rubber, EPDM, polybutadiene, polyisoprene, copolymers of butadiene and/or isoprene with lesser amounts of comonomers such as styrene, acrylonitrile, methyl methacrylate, and the like, dissolved in the styrene and any other monomers included in the polymerizable material. When employed, the rubber ordinarily constitutes from about 1 to about 10 percent by weight of the polymerizable material.

The blowing agent employed in the practice of the invention is preferably a volatile organic compound which has an atmospheric boiling point of less than about 80° C., preferably in the range of about −10° C. to about 80° C. It should be non-reactive and have at most a slight solvent action on the end-product polymer. Exemplary of suitable blowing agents for thermoplastic styrene polymers are the aliphatic hydrocarbons such as butane, isobutane and the pentanes. The preferred blowing agent for use in the present invention is pentane.

When desired, the blowing agent can comprise a mixture of a major amount, for example 70–99 percent by weight, of a blowing agent of the type described above and a minor amount, such as 30–1 percent by weight, of an organic solvent having a solvent action on the product polymer(s). Exemplary of suitable solvents for thermoplastic styrene polymers are acetone, methylene chloride, styrene monomer, benzene, xylene, carbon tetrachloride, chloroform, and the like.

The total amount of blowing agent employed in the process of the invention is from about 3 to about 10 percent, preferably from about 5 to about 8 percent, based on the weight of the polymerizable material.

In one preferred manner of utilizing the invention in the production of uniformly-sized, expandable polystyrene beads, an 8000 liter suspension polymerization vessel is charged with 3400 liters water, 165 grams Naccanol 90F, 10 grams potassium persulfate, 15 kilograms tricalcium phosphate, 3750 liters styrene monomer, 16.8 kilograms benzyl peroxide (75% solution) and 3.5 kilograms T-butyl perbenzoate. The reactor temperature is raised to about 90° C. over a period of about one hour and the suspension polymerization conducted at that temperature for about another five hours. At about that time an exotherm is noted by the reaction vessel temperature climbing to about 92° C. At that point, about 70 percent of the styrene has been converted to polystyrene and the beads are hard and discrete and still contain styrene monomer. 1.7 kilograms tricalcium phosphate are added, the reaction vessel is cooled to about 82° C., and the partially polymerized polystyrene beads are dumped, washed, rinsed, dewatered and dried. The dried polystyrene particles are screened and the particles of desired size are segregated. Beads of a size larger or smaller than the desired expandable bead size are preferably recycled to the styrene monomer holding tank for dissolution and reuse in the suspension polymerization vessel.

Once sufficient beads in the desired size range have been accumulated, the polymerization vessel is charged with 3400 liters demineralized water, 3400 kilogram beads, 1650 grams tricalcium phosphate and 10 grams potassium persulfate. 34 kilograms BCL 46L tetrabromovinyl cyclohexane and 8.5 kilograms dicumyl peroxide dissolved in 50 kilograms styrene monomer are added to the reactor, the temperature of which is then raised to 100° C. During temperature build-up in the reactor, the reactor is pressurized with nitrogen to 10 psi for one-half hour. Then 405 liters pentane are slowly added over a one and one-half hour period. The reactor is then held at 110° C. for 6 hours and then cooled to 35° C., at which point antifoam is added and the reactor dumped. The beads are washed with water containing nitric acid, rinsed, dewatered in a centrifuge, dried in a fluidized bed at 90° F., and lubricated with 0.0075% zinc stearate and 0.01% HISIL to yield uniformly sized, expandable polymeric beads of polystyrene suitable for use in expansion molding processes.

I claim:

1. In a method of making expandable polymeric particles by way of suspension polymerization, the improvement of achieving expandable polymeric particles falling within a desired size range comprising the steps of:

(a) interrupting said suspension polymerization at the completion of a first stage at which time the polymerization of the polymerizable material is not more than 80% complete yet forms particles having sufficient physical integrity to withstand size classification;

(b) classifying said particles by size to yield partially polymerized particles falling within a desired size range;

(c) completing the polymerization of said desirably-sized partially polymerized particles during a second stage suspension polymerization; and (d) impregnating the desirably-sized particles with blowing agent.

2. The method of claim 1, in which undesirably-sized partially polymerized particles resulting from step (b) are recycled to polymerizable material used as feedstock for said first stage suspension polymerization.

3. The method of claims 1 or 2, in which said second stage suspension polymerization and said impregnation with blowing agent occur substantially simultaneously.

4. The method of claim 1 wherein the polymerization in the first stage is at least 58% complete.

5. A method of making expandable polymeric particles from polymerizable material comprising the steps:

(a) conducting a first stage suspension polymerization of said polymerizable material to a point where the particles so-formed have sufficient physical integrity to withstand size classification but before the polymerization is more than 80% complete;

(b) classifying the partially polymerized particles into particles of desired size and particles of undesirable size;

(c) conducting a second stage suspension polymerization of said desirably-sized partially polymerized particles and impregnating the particles with blowing agent in the course of said second stage polymerization; and (d) recycling said undesirably-sized partially polymerized particles for dissolution in polymerizable material used as feedstock for said first stage polymerization.

6. A method according to claim 5, wherein said polymerizable material comprises styrene.

7. A method according to claim 6, wherein said blowing agent comprises pentane.

8. A method according to claim 7, wherein said second stage polymerization is conducted at a higher temperature than said first stage polymerization.

9. A method of making expandable polystyrene beads comprising the steps:

(a) conducting a first stage suspension polymerization of styrene to a point where the so-formed polystyrene beads will withstand the rigors of size classification but before the polymerization is more than 80% complete;

(b) classifying the partially polymerized polystyrene beads by size;

(c) conducting a second stage suspension polymerization of desirably-sized partially polymerized polystyrene beads resulting from step (b) and rendering said beads expandable in the course of said polymerization via impregnation with blowing agent.

10. A method according to claim 9, wherein said second stage polymerization is conducted at a higher temperature than said first stage polymerization and said blowing agent comprises pentane.

11. The method of claim 5 wherein the polymerization in the first stage is at least 58% complete.

12. The method of claim 9 wherein the polymerization in the first stage is at least 58% complete.

13. In a method of making expandable polymeric particles by way of suspension polymerization, the improvement of achieving expandable polymeric particles falling within a desired size range comprising the steps of:

(a) interrupting said suspension polymerization at the completion of a first stage at which time the polymerization of the polymerizable material is about 70% complete and the particles have sufficient physical integrity to withstand size classification;

(b) classifying said particles by size to yield partially polymerized particles falling within a desired size range;

(c) completing the polymerization of said desirably-sized partially polymerized particles during a second stage suspension polymerization; and (d) impregnating the desirably-sized particles with blowing agent.

14. A method of making expandable polymeric particles from polymerizable material comprising the steps:

(a) conducting a first stage suspension polymerization of said polymerizable material to a point where the particles so-formed have sufficient physical integrity to withstand size classification and the polymerization is about 70% complete;

(b) classifying the partially polymerized particles into particles of desired size and particles of undesirable size;

(c) conducting a second stage suspension polymerization of said desirably-sized partially polymerized particles and impregnating the particles with blowing agent in the course of said second stage polymerization; and (d) recycling said undesirably-sized partially polymerized particles for dissolution in polymerizable material used as feedstock for said first stage polymerization.

15. A method of making expandable polystyrene beads comprising the steps:

(a) conducting a first stage suspension polymerization of styrene to a point where the so-formed polystyrene beads will withstand the rigors of size classification and the polymerization is about 70% complete;

(b) classifying the partially polymerized polystyrene beads by size; and (c) conducting a second stage suspension polymerization of desirably-sized partially polymerized polystyrene beads resulting from step (b) and rendering said beads expandable in the course of said polymerization via impregnation with blowing agent.

* * * * *